United States Patent [19]

Stegmaier

[11] Patent Number: 4,765,693
[45] Date of Patent: Aug. 23, 1988

[54] VALVE ASSEMBLY

[75] Inventor: Alwin Stegmaier, Schwieberdingen, Fed. Rep. of Germany

[73] Assignee: Robert Bosch GmbH, Stuttgart, Fed. Rep. of Germany

[21] Appl. No.: 5,793

[22] Filed: Jan. 21, 1987

[30] Foreign Application Priority Data

Mar. 8, 1986 [DE] Fed. Rep. of Germany ....... 3607693

[51] Int. Cl.$^4$ .......................... B60T 13/68; B60T 8/36
[52] U.S. Cl. .................................. 303/119; 303/115; 137/596.17
[58] Field of Search ............... 91/31, 464; 137/596.17, 137/596.2, 627.5; 251/129.15, 129.22; 303/68, 113, 115, 119

[56] References Cited

U.S. PATENT DOCUMENTS

| 3,989,063 | 11/1976 | Brouavers et al. | |
|---|---|---|---|
| 4,138,165 | 2/1979 | Blomberg et al. | 303/115 X |
| 4,141,595 | 2/1979 | Leiber | 303/10 |
| 4,155,603 | 5/1979 | Harries | 303/119 X |
| 4,422,695 | 12/1983 | Farr | 303/115 |
| 4,640,558 | 2/1987 | Nomura et al. | 303/119 |

FOREIGN PATENT DOCUMENTS 2569382 8/1985 France ............................... 303/119

*Primary Examiner*—Andres Kashnikow
*Assistant Examiner*—Timothy E. Newholm
*Attorney, Agent, or Firm*—Edwin E. Greigg

[57] ABSTRACT

A valve assembly for an anti-skid brake system has at least two valves disposed parallel to one another. Both valves are embodied in the manner of check valves having closing springs. To open the valves, there is an armature displaceable by an electromagnet; the armature opens the first valve automatically via a rigid opening tappet and opens the second valve, via another opening tappet and a spring associated with it, only when a pressure urging the second valve in the closing direction does not exceed a preselected pressure difference relative to an armature chamber. This has the advantage that despite the high pressure drop, the quantity of pressure fluid per unit of time that flows through the valve assembly does not exceed a preselected threashold value in the anti-skid regulation situation; on the other hand, without anti-skid operation, a rapid buildup of brake pressure is possible by furnishing a larger flow cross section.

24 Claims, 2 Drawing Sheets

VALVE ASSEMBLY

BACKGROUND OF THE INVENTION

The invention is based on a valve assembly as set forth hereinafter.

From U.S. Pat. No. 3,989,063, a valve assembly suitable for an anti-skid brake system is known, which includes two valves, actuatable in succession, having valve seats and valve balls, and which has an electromagnet having an armature and at least one restoring spring engaging it and at least one barrier spring. By subjecting a coil of the electromagnet to two current intensities of different levels, it is possible to close a so-called master cylinder connection of the valve assembly and thereby disconnect it from a wheel brake connection, or to connect this wheel brake connection to a pressure relief connection. A pressure prevailing at the wheel brake connection may for example be kept constant, even if a higher pressure prevails at the master cylinder connection, for example because of a more forceful actuation of the brake pedal. If the maintenance of constant pressure in the wheel brake connection is terminated by switchover of the valve assembly, so that the pressure prevailing in the master cylinder connection is propagated unhindered in the wheel brake connection, then disadvantageously rapid rises of brake pressure may sometimes occur in the associated wheel brake, which can lead to disadvantageously severe overbraking of an associated wheel.

In a brake system known from U.S. Pat. No. 4,141,595 (FIG. 2), to avoid disadvantageously rapid brake pressure increases in the anti-skid situation, a valve assembly having a built-in throttle has been provided. This throttle, which is operative in a particular switching position of the valve assembly, disadvantageously hinders rapid brake pressure increases after brake pressure reductions that were performed for the sake of skid prevention. U.S. Pat. No. 4,141,595 does not disclose any constructive details for practical embodiment of a valve assembly with a built-in throttle.

OBJECT AND SUMMARY OF THE INVENTION

The valve assembly has the advantage that it enables a desired retardation of automatic brake pressure increases in a space-saving manner; at low engineering cost.

The provisions recited herein disclose advantageous features of and improvements to the valve assembly disclosed. The new characteristics disclose an advantageous combination for vehicle brake systems. The characteristics have the advantage, for instance inside a vehicle brake system, that whenever the particular connection is joined to a brake pressure transducer, technologically simple control of the rates of increase of brake pressures is effected in at least one wheel brake as a function of pressure differences between the master cylinder connection and the wheel brake connection. For supplying current to the electromagnet to this end, a conventionally embodied control unit such as that used in the previously known valve assembly according to U.S. Pat. No. 3,989,063, is adequate. Some features disclose advantageous embodiment of the valve assembly which have an advantage that throughputs can be adapted to given requirements, and an economical means of attaining this have been set forth. Other advantages rely in bleeding the valve assembly which can be done in a simple manner.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
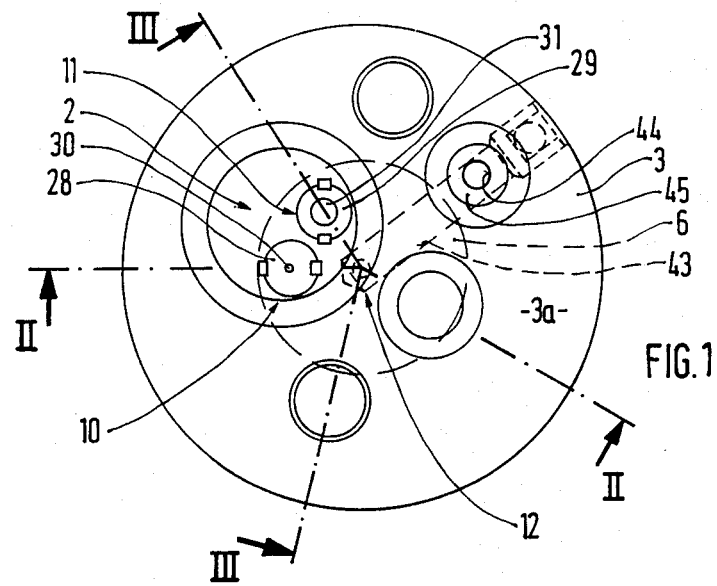
FIG. 1 is a cross section taken through the valve assembly according to the invention.

The valve assembly 2 has a housing 3 that together with a coil 4 forms an electromagnet 5, a linear armature 6 that is movable in the electromagnet 5, two restoring springs 7, 8, a barrier spring 9 and three valves 10, 11 and 12 accommodated in the housing 3.

Belonging to the valves is a connection indentation 13 that begins at an upper end face 3a of the housing 3. This connection indentation 13 is joined via a connecting part 14 with a so-called brake pressure transducer connection 15. Depending on how an anti-skid brake system, not shown in further detail, is embodied, this brake pressure transducer connection 15 may be connected to a brake pressure control valve or a master brake cylinder and a return pump or a brake pressure feeding apparatus. Two parallel-oriented chambers 16 and 17 originate at the connection indentation 13 and terminate at valve seats 18, 19. From the valve seats 18, 19, connecting bores 20, 21 lead to an armature chamber 22. The armature 6 is displaceable inside this armature chamber 22. Opposite from these valves 10, 11 and 12, the housing 3 is closed by means of a magnet core 23. The valves 10 and 11 have valve elements 24 and 25 embodied as balls. Closing springs 26 and 27 are disposed inside the chambers 16 and 17, urging the valve elements 24 and 25 toward their valve seats 18 and 19. Because of the closing springs 26 and 27, the valves 10 and 11 act as check valves whenever higher pressure prevail in the connecting bores 20 and 21 than in the chambers 16 and 17 and whenever no opening forces, to be described below, lift the valve elements 24 and 25. The chambers 16 and 17 are partly closed by ring disks 28 and 29. One end of closing springs 26 and 27 are supported on these ring disks 28 and 29. The ring disks 28 and 29 are secured in their position shown, by bracing, for example. The ring disks 28 and 29 have holes 30 and 31, each of which act as throttle openings, to a variable extent depending on their diameter.

A coupling element in the form of an opening tappet 32 is oriented in the extension of the longitudinal axis of the connecting bore 20. A coupling element embodied in the form of an opening tappet 33 is also located in the extension of the connecting bore 21. This opening tappet 33 extends longitudinally displaceably into a guide bore 34 located in the armature 6. This guide bore 34 additionally receives a spring 36 in a pre-stressed state, which presses against a collar 36 disposed on the opening tappet 33. A perforated disk 38 secured to the end 37 of the armature 6 serves as a stop for the collar 36 to prevent it from being pushed out of the armature 6 by the force of the spring 35.

The valve 12 comprises a valve seat 39, beginning at the armature chamber 22; an associated valve element 40, which is embodied as a ball; and a rodlike coupling element 41. Originating at the valve seat 39 is a connecting bore 42, which communicates via further bores 43 and 44 with a connection indentation 45. The connection indentation 45 is part of a so-called relief connection, which depending on the embodiment of the brake system may for instance communicate with a return container or directly with a return pump.

Another bore 46 begins at the armature chamber 22 and terminates at a connection indentation 47. This connection indentation 47 is for example part of a wheel brake connection 48.

The rodlike coupling element 41 is extended through the perforated disk 38 and has a collar 49 inside the armature 6. Coaxially with the coupling element 41, the armature 6 has a receiving bore 50 for the barrier spring 9 and a stop ring 51, which is displaceable inside the receiving bore 50 and has an annular attachment 52, which is located between the barrier spring 9 and the collar 49. A spacer ring 53 is inserted between the stop ring 51 and the perforated disk 38. The receiving bore 50 is contiguous with a bore 54 that has a smaller diameter than the receiving bore 50. Extending through this bore 54 is a tappet 55 that is displaceable relative to the armature 6 and has an unattached collar 56 inside the receiving bore 50. The collar 56 forms an abutment that is movable relative to the stop ring 51. The barrier spring 9 is supported on the collar 56. In the basic position of the armature 6, the tappet 55 is spaced apart from the magnet core 23, which forms an abutment for this tappet 55 in a manner to be described below. The bore 54 is adjoined by a receiving bore 57, which has a larger diameter than the bore 54 and receives the restoring spring 7. The restoring spring 7 is embodied as a helical spring and is installed in the pre-stressed state, being supported on the restoring spring 8, which in turn rests on the magnet core 23. The restoring spring 8 is made of an anti-magnetic material in the form of a spring washer. In the basic position of the armature 6 shown, there is a spacing between this armature 6 and the restoring spring 8. The barrier spring 9 and the restoring spring 7 are matched in such a way that in the basic position of the armature 6 shown, the valve element 40 rests on the valve seat 39 and the stop ring 51 rests on the spacer ring 53, which in turn presses against the perforated disk. A smaller diameter pre-stressed spring 9a is located between the coupling element 41 and the tappet 55.

The lengths of the opening tappets 32 and 33 are selected such that in the basic position of the armature 6 shown, the valve elements 24 and 25 are raised from their valve seats 18 and 19 counter to the forces of the closing springs 26 and 27. The closing spring 27 and the spring 35 are matched to one another such that whenever the same pressure prevails in both the connection indentation 13 and the armature chamber 22, the collar 36 of the opening tappet 33 rests on the perforated disk 38, which acts as a stop in the manner already described.

Beginning with the basic position shown, in which current is not flowing, imposing a first current intensity on the coil 4 causes the armature to move in the direction of the magnet core 23 until the tappet 55 meets the washer-like restoring spring 8. The opening tappets 32 and 33 are thereby moved in the direction of the magnet core 23, so that under the influence of the closing springs 26 and 27 the valve elements 24 and 25 become seated on their valve seats 18 and 19. A spring 9a, which presses in the direction of the valve seat 39 and is supported on the tappet 55, keeps the valve 12 closed. The aforementioned play of the collar 49 between the attachment 52 and the spacer ring 53 enables the the spring 9a to transmit the desired closing force to the coupling element. As a result, the armature chamber 22 is closed off with respect to the brake pressure transducer connection 15 and the connection indentation 45. The armature chamber 22 now communicates only with the connection indentation 47, which is for instance associated with a wheel brake connection 48.

When a second, more intense current is imposed on the coil 4, the armature 6 compresses the restoring spring 7 further, and in so doing compresses the restoring spring 8 until finally it is virtually flat. In this process the armature 6 also overcomes the force of the pre-stressed barrier spring 9, so that the perforated disk 38 connected to the armature 6 acts upon the collar 49 via the spacer ring 53, overcoming the force of the spring 9a, and as a result, via the rodlike coupling element 41, pulls the valve element 40 away from its valve seat 39. The armature chamber 22 is thereby made to communicate with the connection indentation 45. If there is pressure prevailing inside the armature chamber 22, then this pressure can escape through the bores 42, 43 and 44, with the result that the pressure decreases in the armature chamber 22, and hence in the wheel brake connection 48 as well. The described opening of the valve 12, to which the valve seat 39 belongs, is typically performed whenever there is a danger of wheel locking, if the valve assembly 2 described is being used in a vehicle brake system. The described pressure reduction causes the danger of wheel locking to be overcome.

Once the danger of wheel locking is over, pressure can be introduced into the armature chamber 22 by shutting off the current to the coil 4. To this end, pressure in the connection indentation 13 is necessary. This pressure is furnished, as already indicated, by a brake pressure transducer. Let it be assumed for now that this pressure is markedly above the pressure that remains in the armature chamber 22. The effect of shutting off the current to the coil 4 then has the effect that by returning the armature to its initial position shown, the opening tappet 32 that is rigidly connected to the armature 6 opens the valve 10. By matching the closing spring 27 with the spring 35, the force of the spring 35 is not sufficient, because of the imposition of the aforementioned pressure from the connection indentation 13 upon the valve element 25, to additionally overcome the closing force of the valve element 25 generated by the aforementioned imposition. As a result, pressure fluid will flow from the connection indentation 13 only through the valve 10 into the armature chamber 22 and from there to the wheel brake. Only once a pressure difference between this connection indentation 13 and the armature chamber 22 has dropped sufficiently, which in practice corresponds to the end of anti-skid regulation, is the spring 35 capable of raising the valve element 25 from its valve seat 19. This has the effect of making available an additional flow cross section for pressure fluid between the connection indentatoin 13 and the armature chamber 22. It will be appreciated that as a result of the embodiment of the valve assembly 2, given the typical pressure differences, brake pressure rises are delayed during anti-skid braking regulation, while contrarily with small pressure differences between the connection indentation 13 and the armature chamber 22, there is a comparatively largely unthrottled flow through the valve assembly 2. As a result, it is possible to build up brake pressures in wheel brakes relatively without hindrance upon actuation of the brake pedal transducer, for instance by means of a brake pedal.

As already indicated, the valve 11 serves to cause the maximum possible quantities of pressure fluid to flow through the valve assembly 2 during normal braking, and to allow the brake pressure desired by the driver to become effective in the wheel without delay. As a result, a hole 31 disposed in the associated ring disk 29 is embodied only large enough that the remaining annular cross section serves substantially only to support the closing spring 27. By comparison, the diameter of the hole 30 in the ring disk 38 is selected to be so narrow that even with a large pressure difference between the connection indentation 13 and the armature chamber 22, only a desirably slow pressure rise takes place in the associated wheel brake. The size of the valve element 24, the valve seat 18 and an inside cross section between the connecting bore 20 and the opening tappet 32 are selected such that with a large hole 30, a desired minimum throughput of pressure fluid comes about. The throttling is thus preferably accomplished by embodying the ring disk 28 as a throttle. It is then possible to adapt to required pressure fluid throughputs per unit of time by exchanging the ring disk 28 for a disk having some other hole diameter.

The basic concept of the invention, as will be understood from the description, is directed to varying the rates of pressure rise in a pressure receiver, which may for example be the wheel brake mentioned several times above. To apply this basic concept, it is accordingly unnecessary to include a pressure reduction valve 12 in the valve assembly 2. As in the prior art, such a valve 12 intended for decreasing pressure can also be disposed outside the valve assembly as a separate valve. There are examples of this in the prior art.

Figure 3:
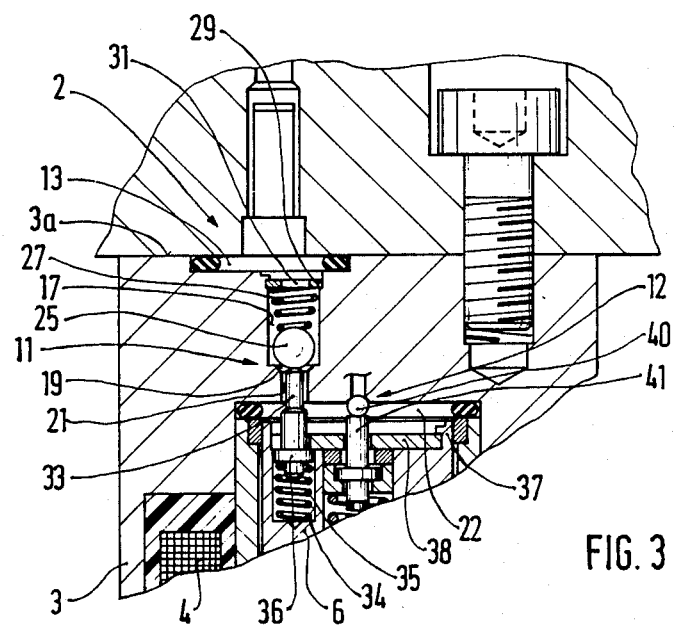
FIG. 3 is a partial second longitudinal section through the valve assembly of FIG. 1.
Figure 2:
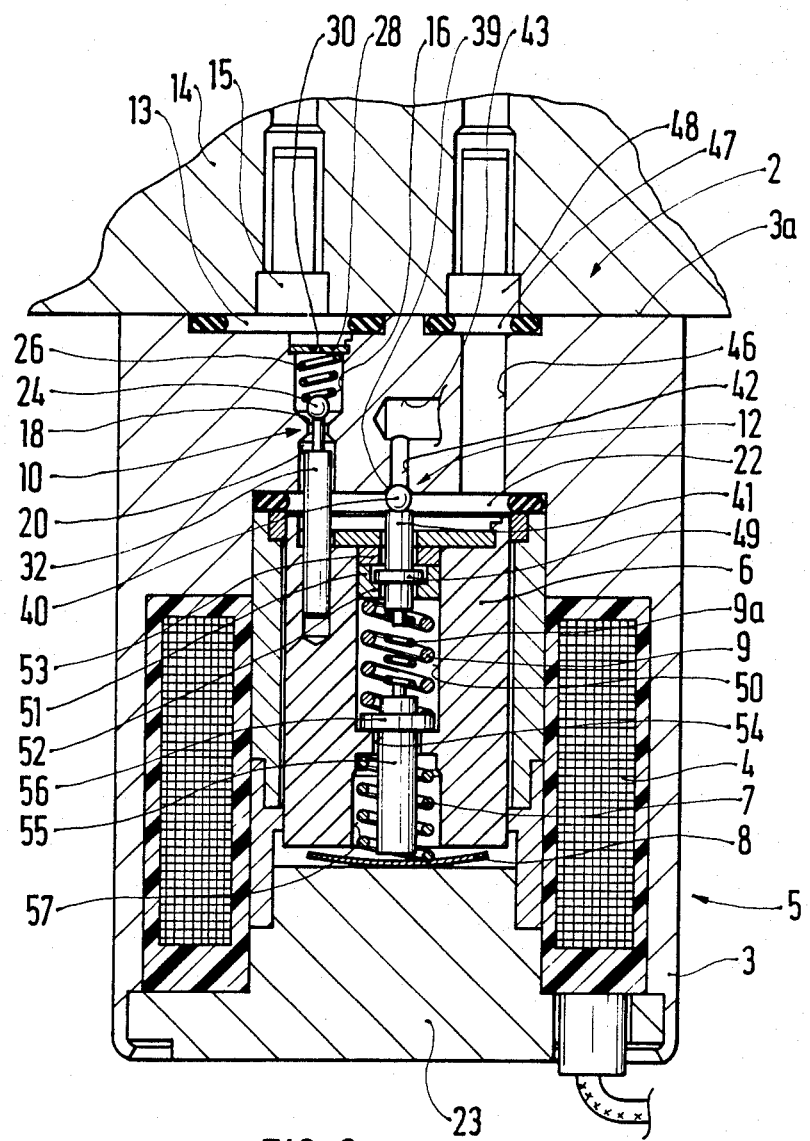
FIG. 2 is a first longitudinal section through the valve assembly of FIG. 1.

The valve assembly 2 is shown in FIGS. 2 and 3 in its installed position in which it is used. In other words, the connection indentations 13, 45 and 47 and the valves 10, 11, 12 are located above the armature chamber 22. This has the advantage that when the armature chamber 22 is being filled with pressure fluid, bleeding is attainable without requiring complicated constructonal provisions.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A valve assembly having a housing, at least two fluid connections for an anti-skid brake system, an electromagnet upon which different current intensities are imposed, an armature and at least one restoring spring and a barrier spring, first, second and third valves operative by said electromagnet for each of said valves, valve seats and valve elements movable relative to the valve seats, which valve elements are controllable via valve coupling elements by said armature and said at least one restoring spring of said armature, said first and seocnd valves (10, 11) being connected to a common fluid connection (13, 15) and embodied in the manner of check valves, closing spring means (26, 27) for closing said first and second valves with said first and second valves being oriented in a parallel disposition beside one another and synchronously closable such that they have the same opening and closing direction relative to said fluid connection (13, 15), and said valve coupling elements (32, 33, 35, 36) are embodied such that said valve elements (24, 25) of said first and second valves (10, 11) are closed simultaneously by an armature of said electromagnet which executes a stroke path, which stroke path is substantially the same as a valve closing stroke, and said valve elements (24, 25) are raisable in succession from their valve seats (18, 19).

2. A valve assembly as defined by claim 1, characterized in that the fluid connection (13, 15) belonging to said first and second valves (10, 11) is a brake pressure source, and that said first and second valves (10, 11) are oriented such that they are openable by means of fluid pressure in the direction of the brake pressure source.

3. A valve assembly as defined by claim 1 in which said coupling element (32) of said first valve (10) is embodied as an opening tappet (32) rigidly secured to the armature (6), and that the coupling element (33) of said second valve (11) is embodied as an opening tappet (33) displaceable relative to the armature (6), which coupling element (33) is urged in the direction of the valve element (25) of said second valve (11) by means of a pre-stressed spring (35) carried by said armature (6), wherein the force of the pre-stressed spring (35) is greater than that of the associated closing spring (27) that acts upon said second valve element (25).

4. A valve assembly as defined by claim 2 in which said coupling element (32) of said first valve (10) is embodied as an opening tappet (32) rigidly secured to the armature (6), and that the coupling element (33) of said second valve (11) is embodied as an opening tappet (33) displaceable relative to the armature (6), which coupling element (33) is urged in the direction of the valve element (25) of said second valve (11) by means of a pre-stressed spring (35) carried by said armature (6), wherein the force of the pre-stressed spring (35) is greater than that of the associated closing spring (27) that acts upon said second valve element (25).

5. A valve assembly as defined by claim 1, in which chambers (16, 17) are provided in parallel alignment between said first and second valve seats (18, 19) and said common connection (13, 15), in which said chambers receive said movable valve elements (24, 25) and said closing springs (26, 27), and said chambers (16, 17) are partly closed in a direction toward a master brake cylinder by means of fixed ring disks (28, 29) spaced from said first and second valves, on which said closing springs (26, 27) are supported at one end, and at least one of said ring disk forms a throttle chamber (30,31).

6. A valve assembly as defined by claim 2, in which chambers (16, 17) are provided in parallel alignment between said first and second valve seats 18, 19) and said common connection (13, 15), in which said chambers receive said movable valve elements (24, 25) and said closing springs (26, 27), and said chambers (16, 17) are partly closed in a direction toward a master brake cylinder by means of fixed ring disks (28, 29) spaced from said first and second valves, on which said closing springs (26, 27) are supported at one end, and at least one of said ring disk forms a throttle chamber (30, 31).

7. A valve assembly as defined by claim 3, in which chambers (16, 17) are provided in parallel alignment between said first and second valve seats (18, 19) and said common connection (13, 15), in which said chambers receive said movable valve elements (24, 25) and said closing springs (26, 27), and said chambers (16, 17) are partly closed in a direction toward a master brake cylinder by means of fixed ring disks (28, 29) spaced from said first and second valves, on which said closing springs (26, 27) are supported at one end, and at least one of said ring disk forms a throttle chamber (30, 31).

8. A valve assembly as defined by claim 4, in which chambers (16, 17) are provided in parallel alignment between said first and second valve seats (18, 19) and said common connection (13, 15) in which said chambers receive said movable valve elements (24, 25) and said closing springs (26, 27), and said chambers (16, 17) are partly closed in a direction toward a master brake cylinder by means of fixed ring disks (28, 29) spaced from said first and second valves, on which said closing springs (26, 27) are supported at one end, and at least one of said ring disks forms a throttle chamber (30, 31).

9. A valve assembloy as defined by claim 5, in which one of said ring disks (28) is embodied as a throttle associated with said first valve (10), and another ring disk (29) is embodied as a throttle associated with said second valve.

10. A valve assembly as defined by claim 6, in which one of said ring disks (28) is embodied as a throttle associated with said first valve (10), and another ring disk (29) is embodied as a throttle associated with said second valve.

11. A valve assembly as defined by claim 7, in which one of said ring disks (28) is embodied as a throttle associated with said first valve (10), and another ring disk (29) is embodied as a throttle associated with said second valve.

12. A valve assembly as defined by claim 8, in which one of said ring disks (28) is embodied as a throttle associated with said first valve (10), and another ring disk (29) is embodied as a throttle associated with said second valve.

13. A valve assembly as defined by claim 1, in which said first, second and third valves (10, 11, 12) are located above an armature chamber (22) which receives said armature (6) in a movable manner, and said first, second and third valves include fluid connections which are located in one face end (3a) of said housing.

14. A valve assembly as defined by claim 2, in which said first, second and third valves (10, 11, 12) are located above an armature chamber (22) which receives said armature (6) in a movable manner, and said first, second and third valves include fluid connections which are located in one face end (3a) of said housing.

15. A valve assembly as defined by claim 3, in which said first, second and third valves (10, 11, 12) are located above an armature chamber (22) which receives said armature (6) in a movable manner, and said first, second and third valves include fluid connections which are located in one face end (3a) of said housing.

16. A valve assembly as defined by claim 5, in which said first, second and third valves (10, 11, 12) are located above an armature chamber (22) which receives said armature (6) in a movable manner, and said first, second and third valves include fluid connections which are located in one face end (3a) of said housing.

17. A valve assembly as defined by claim 6, in which said first, second and third valves (10, 11, 12) are located above an armature chamber (22) which receives said armature (6) in a movable manner, and said first, second and third valves include fluid connections which are located in one face end (3a) of said housing.

18. A valve assembly as defined by claim 9, in which said first, second and third valves (10, 11, 12) are located above an armature chamber (22) which receives asid armature (6) in a movable manner, and said first, second and third valves include fluid connections which are located in one face end (3a) of said housing.

19. A valve assembly as set forth in claim 1 in which said third valve is operative in an opening position subsequent to operation of said first and second valves.

20. A valve assembly as defined by claim 4, in which said first, second and third valves (10, 11, 12) are located above an armature chamber (22) which receives said armature (6) in a movable manner, and said first, second and third valves include fluid connections which are located in one face end (3a) of said housing.

21. A valve assembly as defined by claim 7, in which said first, second and third valves (10, 11, 12) are located above an armature chamber (22) which receives said armature (6) in a movable manner, and said first, second and third valves include fluid connections which are located in one face end (3a) of said housing.

22. A valve assembly as defined by claim 10, in which said first, second and third valves (10, 11, 12) are located above an armature chamber (22) which receives said armature (6) in a movable manner, and said first, second and third valves include fluid connections which are located in one face end (3a) of said housing.

23. A valve assembly as defined by claim 11, in which said first, second and third valves (10, 11, 12) are located above an armature chamber (22) which receives said armature (6) in a movable manner, and said first, second and third valves include fluid connections which are located in one face end (3a) of said housing.

24. A valve assembly as defined by claim 12, in which said first, second and third valves (10, 11, 12) are located above an armature chamber (22) which receives said armature (6) in a movable manner, and said first, second and third valves include fluid connections which are located in one face end (3a) of said housing.

* * * * *